United States Patent Office 3,328,311
Patented June 27, 1967

3,328,311
SELECTED LUMINESCENT MOLYBDATES AND TUNGSTATES OF Sc, La, Eu, Gd, and Lu
Hans J. Borchardt, Wilmington, Del., assignor to E. I. du Pont de Nemours and Company, Wilmington, Del., a corporation of Delaware
No Drawing. Filed May 5, 1965, Ser. No. 453,502
17 Claims. (Cl. 252—301.5)

This application is a continuation-in-part of copending application Ser. No. 264,065, filed Mar. 11, 1963 (now abandoned), which is a continuation-in-part of application Ser. No. 186,602, filed Apr. 6, 1962, now Patent No. 3,250,722, which is a continuation-in-part of application Ser. No. 150,477 filed Nov. 6, 1961 (now abandoned).

The present invention relates to novel luminescent compositions, and more particularly to such compositions containing rare earth elements and molybdenum or tungsten.

The novel luminescent compositions of the present invention consist of mixed oxide compounds of a selected rare earth element and tungsten or molybdenum and certain solid solutions of selected rare earth elements associated with a common tungsten or molybdenum component. The rare earth elements used in this invention are scandium, lanthanum, gadolinium, lutecium, europium, samarium or dysprosium. The compounds of the present invention are $Sc_2O_3.3WO_3$, $3Sc_2O_3.WO_3$, $Eu_2O_3.3WO_3$, $Gd_2O_3.3WO_3$, $Lu_2O_3.3WO_3$, $La_2O_3.WO_3$, $Gd_2O_3.WO_3$, $Sc_2O_3.3MoO_3$, $Eu_2O_3.3MoO_3$, $Gd_2O_3.3MoO_3$ $Lu_2O_3.3MoO_3$, $La_2O_3.2MoO_3$. The solid solutions of the present invention are solid solutions of $La_2O_3.3WO_3$ or $Gd_2O_3.3WO_3$ with $Dy_2O_3.3WO_3$ or $Sm_2O_3.3WO_3$ wherein the content of $La_2O_3.3WO_3$ or $Gd_2O_3.3WO_3$ ranges from about 90 to about 99 mole percent. These solid solutions can be represented by the formulae $(La_{1-x}Sm_x)_2O_3.3WO_3$, $(La_{1-x}Dy_x)_2O_3.3WO_3$, $(Gd_{1-x}Sm_x)_2O_3.3WO_3$ and $(Gd_{1-x}Dy_x)_2O_3.3WO_3$ wherein $x$ is about from 0.01 to 0.10. The solid solutions of this invention can be viewed as a crystal lattice of lanthanum or gadolinium tungstate in which a portion of the lanthanum atoms or gadolinium atoms in the crystal lattice are replaced by samarium or dysprosium. Thus, the solid solution $(La_{0.96}Sm_{0.04})_2O_3.3WO_3$ can be viewed as a one-phase system in which a portion of the lanthanum atoms in the crystal lattice are replaced by samarium atoms.

The rare earth compounds and solid solutions of this invention described above can be characterized by conventional X-ray powder diffraction techniques. X-ray spectra can be conveniently determined on a Norelco X-ray diffraction unit using a recording spectrometer, $CuK_\alpha$ radiation, 1° slits, a nickel filter and a scan rate of 1° of $2\phi$/min. If greater resolution is desired, a Guinier camera can be employed. As is recognized in the art, X-ray powder patterns may not reveal the presence of a phase unless about 5% of that phase is present. Accordingly, it is possible, though not probable, that stated formulae indicated herein may deviate by an amount consistent with the aforementioned limitation and should be so interpreted.

The X-ray patterns of each of the compositions of this invention are characteristic thereof and are different from the patterns of the reactants leading to their formation and, in the solid solutions of this invention, different from the individual tungstate components thereof. For instance, the diffraction pattern for $Sc_2O_3.3WO_3$ is different from and not the summation of the patterns for $Sc_2O_3$ and $WO_3$.

The novel compositions of the present invention are chemical compounds and solid solutions of chemical compounds as shown by X-ray diffraction spectra and not mixtures of the rare earth oxides with tungstic oxide or molybdic oxide. The complete X-ray diffraction patterns for two of the compounds of this invention are given in Tables I and II. These diffraction patterns are considerably different from the patterns of $WO_3$, $MoO_3$, $Gd_2O_3$, $Sc_2O_3$ or mixtures thereof. When an excess of any one of the constituents used in making the compound is mixed with the compound, the X-ray diffraction pattern of the mixture contains lines characteristic of the compound and of the constituent added.

TABLE I.—X-RAY DIFFRACTION PATTERN FOR $Sc_2O_3.3WO_3$

| d: | $I/I_o$ | d: | $I/I_o$ |
|---|---|---|---|
| 6.505 | 11 | 3.252 | 11 |
| 5.940 | 23 | 3.070 | 28 |
| 4.691 | 8 | 2.989 | 14 |
| 4.480 | 44 | 2.947 | 15 |
| 4.227 | 58 | 2.877 | 4 |
| 4.019 | 82 | 2.824 | 12 |
| 3.966 | 100 | 2.728 | 28 |
| 3.863 | 24 | 2.650 | 10 |
| 3.668 | 25 | 2.612 | 13 |
| 3.587 | 60 | 2.479 | 21 |
| 3.361 | 24 | 2.319 | 10 |
| 3.287 | 12 | 2.287 | 21 |

TABLE II.—X-RAY DIFFRACTION PATTERN FOR $Gd_2O_3.3MoO_3$

| d: | $I/I_o$ | d: | $I/I_o$ |
|---|---|---|---|
| 10.57 | 14 | 1.779 | 12 |
| 6.03 | 14 | 1.765 | 8 |
| 5.32 | 100 | 1.752 | 8 |
| 5.17 | 4 | 1.735 | 2 |
| 4.652 | 32 | 1.728 | 4 |
| 4.304 | 5 | 1.707 | 3 |
| 4.062 | 1 | 1.689 | 10 |
| 3.934 | 2 | 1.685 | 11 |
| 3.714 | 36 | 1.649 | 6 |
| 3.666 | 41 | 1.645 | 6 |
| 3.553 | 97 | 1.621 | 4 |
| 3.469 | 46 | 1.610 | 9 |
| 3.278 | 38 | 1.592 | 4 |
| 3.197 | 7 | 1.573 | 5 |
| 3.134 | 8 | 1.492 | 3 |
| 3.095 | 3 | 1.474 | 7 |
| 3.019 | 51 | 1.465 | 3 |
| 2.932 | 34 | 1.441 | 4 |
| 2.793 | 21 | 1.428 | 2 |
| 2.668 | 10 | 1.414 | 3 |
| 2.592 | 9 | 1.410 | 3 |
| 2.550 | 3 | 1.402 | 2 |
| 2.517 | 2 | 1.398 | 2 |
| 2.412 | 5 | 1.391 | 3 |
| 2.384 | 8 | 1.359 | 3 |
| 2.319 | 11 | 1.341 | 3 |
| 2.131 | 4 | 1.337 | 5 |
| 2.094 | 10 | 1.321 | 2 |
| 2.071 | 3 | 1.304 | 2 |
| 2.050 | 4 | 1.302 | 3 |
| 2.033 | 5 | 1.295 | 3 |
| 2.016 | 22 | 1.277 | 2 |
| 1.975 | 22 | 1.273 | 2 |
| 1.945 | 11 | 1.260 | 4 |
| 1.900 | 3 | 1.238 | 2 |
| 1.860 | 2 | 1.225 | 2 |
| 1.842 | 3 | 1.219 | 2 |
| 1.836 | 3 | 1.211 | 3 |

TABLE II.—Continued

| d: | $I/I_0$ | d: | $I/I_0$ |
|---|---|---|---|
| 1.208 | 4 | 1.118 | 3 |
| 1.189 | 3 | 1.109 | 2 |
| 1.178 | 2 | 1.070 | 2 |
| 1.159 | 3 | 1.049 | 2 |
| 1.156 | 2 | 1.047 | 2 |
| 1.150 | 2 | 1.035 | 2 |
| 1.134 | 3 | 1.015 | 2 |

Lattice constants:
$a = 10.369 \pm .005$ A.
$b = 10.369 \pm .005$ A.
$c = 10.672 \pm .005$ A.

The compounds of this invention are prepared by mixing starting materials comprising the rare earth component and a component which contributes $MoO_3$ or $WO_3$, and thereafter heating the resulting mixture at elevated temperatures. The solid solutions of this invention can be prepared in a similar manner, or alternately, preformed rare-earth tungstates can be mixed and heated at elevated temperatures. A reaction temperature of at least about 700° C., and usually at least about 900° C., is employed; however, since the reaction time decreases as the reaction temperature increases, to insure complete reactions in practical periods of time, high reaction temperatures approaching, e.g., within 100° C. of, but in any case below, the temperature at which localized fusion of the reaction mass begins are preferred. If relatively low-melting eutectics are formed during the reaction, it may be desirable to heat the reaction mixture for a period at, e.g., 700–900° C., then regrind the resulting product and finish the reaction at higher temperature.

The rare earth components are preferably introduced into the reaction mixture as oxides. However, rare earth components which decompose to the oxide on heating, for example, rare earth hydroxides, oxalates, carbonates, citrates, acetates, and tartrates can be employed. The $WO_3$ or $MoO_3$-contributing component also is preferably introduced in the form of an oxide such as tungsten oxide or molybdenum oxide. However, this reactant need not necessarily be in the form of an oxide. It can be, for example, in the form of a compound such as tungstic acid, or molybdic acid, or ammonium tungstate, which on ignition is converted to the oxide. Reactants are preferably introduced in the form of finely ground particulate material, preferably having a particle size of less than 10 microns.

The quantities of reactants employed in preparing the compositions of this invention are preferably approximately stoichiometric based on the desired composition of the final product. Thus, for example, in preparing $3Sc_2O_3 \cdot WO_3$, three moles of $Sc_2O_3$ would be heated with one mole of $WO_3$.

The compositions of this invention are all solid materials useful as insulating bodies. Table III gives the electrical properties of a pressed pellet of one representative compound of this invention.

TABLE III.—ELECTRICAL PROPERTIES OF A MIXED OXIDE COMPOUND $Gd_2O_3 \cdot 3MoO_3$

| | |
|---|---|
| Sample density (g./ml.) [1] | 4.25 |
| Resistivity (ohm/cm.) | $5 \times 10^{14}$ |
| Dielectric constant | 8.8 |
| Dissipation factor (percent) | 0.80 |

[1] Density of pressed pellet, not true density.

Insulating bodies can be prepared, for example, by fusing the composition selected, for example $Gd_2O_3 \cdot 3MoO_3$, in a mold and cooling carefully to obtain an insulator of the desired shape. Conductive metals may be coated with an insulating coating by the same technique provided that the melting point of the metal is higher than the fusion temperature of the mixed oxide composition. Conventional powder compaction techniques at temperatures below the melting point followed by sintering of the powder can also be used for fabricating insulating bodies from the compounds of the present invention. Techniques for fabricating insulators are described in, for example, "McGraw-Hill Encyclopedia of Science and Technology," Vol. 7, pp. 158–163 (1960).

The compositions of this invention described above can also be used in forming brightly luminescent solid solutions such as those described in copending application Ser. No. 186,602. In such use, a composition of this invention and at least 3 mole percent of a cognate europium compound or the oxide requisite for its formation are finely ground, intimately mixed and heated under the reaction conditions previously described. For example, 0.75 mole of $Gd_2O_3 \cdot 3WO_3$ and 0.25 mole of $$Eu_2O_3 \cdot 3WO_3$$

can be finely ground, mixed and heated at 1000° C. for four hours to yield the solid solution luminophor $$(Gd_{0.75}Eu_{0.25})_2O_3 \cdot 3WO_3$$

Such luminescent compositions emit exceptionally bright red light at room temperature and are remarkably insensitive to impurities both during preparation and use.

All the compositions of this invention are also luminescent per se, at low temperatures. The solid solutions of this invention and $Eu_2O_3 \cdot 3WO_3$ are luminescent at room temperatures as well.

Luminescent articles and luminescent compositions can be prepared from the aforementioned europium-containing solid solutions as well as directly from the compositions of this invention. The luminescent articles can comprise at least one of the aforementioned luminophors, optionally in admixture with conventional luminescent materials, intimately associated or in adherent contact with a protective layer of a material transparent to radiation emitted by the aforementioned luminophors, that is, visible light. The particular structure of the luminescent articles and the manner in which the luminophor is embodied therein depends to a great extent upon the purpose for which such articles are to be used. The luminophor, for example, can be embedded in the transparent material, adhered to one or more surfaces thereof, combined with just sufficient binder to hold the luminophor particles together and sandwiched between two layers of transparent material, or a combination of these. More specifically, for example, in luminescent signs, the luminophor can be embedded in a polymeric material transparent to incident and emitted radiation and, for example, used as such or adhered to a signboard or the like. In fluorescent lights, the luminophor is conveniently merely adhered to the inner surface of a fluorescent light tube. In cathode ray tubes, the luminophor can be adhered to the inner surface of the glass face plate and, if desired, additional layers, for example, or polymeric material or aluminum transparent to incident radiation applied thereover.

The shape of the luminescent articles is not critical. They can be flat as in luminescent signs, or curved as in fluorescent lights, or even in the form of blocks, rods or cubes which can be used, for example, as raised letters on signs. Examples of luminescent articles prepared in accordance with this invention are fluorescent lights; luminescent signs, markers and identification devices; luminescent sheets, films, coatings, and other shaped articles.

Examples of materials transparent to radiation emitted by the aforementioned phosphors are organic polymeric materials such as homopolymers and copolymers of alkyl acrylates and methacrylates such as methyl methacrylate; polyvinyl acetate; polyethylene; chlorosulfonated polyethylene; polypropylene; polystyrene; polyepoxides, polyesters such as polyethylene terephthalate; polyacrylonitrile; homopolymers and copolymers of vinyl chloride; polyvinyl alcohol; cellulose derivatives such as nitrocellulose and ethyl cellulose; inorganic materials such as various glasses, including silicate and borate glasses, and transparent crystalline materials such as lithium fluoride and sodium chloride; as well as various compatible mixtures thereof.

Luminescent compositions are generally prepared by grinding the aforementioned luminescent materials and dispersing them, either alone or together with conventional phosphors, in a solution or dispersion of a binder, for example, a binder of one or more of the aforementioned materials transparent to the emitted radiation. The resulting compositions can be coated onto a surface, for example, a signboard, and solvent evaporated therefrom to yield a luminescent coating. The concentration of luminophor in such compositions can vary widely, for example, from as low as 2% to as high as 90% based on the total weight of the composition, depending upon the proposed use of the composition. Particular methods for fabrication of the aforementioned articles and preparation of the aforementioned compositions are described in more detail in copending application Ser. No. 186,602 which is incorporated herein by reference.

In the following examples, which illustrate this invention, parts and percentages are by weight unless otherwise indicated.

*Examples 1 to 16*

The compositions shown in the following examples are made by the following method, illustrated for $Sc_2O_3 \cdot 3WO_3$.

$Sc_2O_3$ (0.3586 part) is intimately mixed with $WO_3$ (1.6879 parts). About 1% paraffin is added as a binder and the mixture pressed into pellets. These pellets are heated in air in a platinum vessel for four hours at 1000° C. During the heating the paraffin is burned away. The mixture is converted into the compound $Sc_2O_3 \cdot 3WO_3$ for which the X-ray diffraction pattern is given in Table I and the physical properties in Table IV. The compositions of the other examples are similarly prepared except that the mono $WO_3$ compounds were heated at 1400° C. for four hours and all the $MoO_3$ compounds were heated at 900° C. for four hours.

dried. When the glass plate is placed over a source of 2537 A. ultraviolet light with the coated surface facing the ultraviolet light source, the coating emits bright red light. The product described above consists of luminophor embedded in a protective layer of polymethyl methacrylate which is transparent to both the incident ultraviolet light and the emitted visible red light and which is in adherent contact with a second protective layer of glass.

Instead of coating the luminophor above onto a glass plate, it can be coated onto a signboard, for example, of wood or metal or glass in the form of letters, numbers or designs. In a like manner, the coating composition described above can be used to laminate two layers of glass in signs, markers or other indicating devices. Similarly, other polymeric materials such as other polyalkyl acrylates or methacrylates, polystyrene or polyvinyl acetate can be substituted for the polymethyl methacrylate.

*Example 18*

This example illustrates a method by which standard fluorescent lights can be prepared. $Eu_2O_3 \cdot 3MoO_3$ prepared as previously described is finely ground and dispersed in a dilute lacquer, for example, of nitrocellulose or ethyl cellulose. If desired, in order to obtain a color balance, other luminophors such as manganese- and antimony-activated calcium halophosphates can also be dispersed therein. The resulting lacquer is next run through a standard glass fluorescent light tube and the coating deposited on the inside surface thereof is dried. Next, the coated tube is heated to the temperature, usually somewhat greater than 700° C., at which the cellulose lacquer is burned off and the tube somewhat softened, then the coated tube is cooled. For a standard 40-watt light (120 cm. long, 3.8 cm. dia.), about 1 to 4 grams of luminophor are deposited as just described, depending upon the particle size of the luminophor. The resulting product consists essentially of particles of luminophor firmly adhered to the inner surface of a tubular protective layer of glass. The remaining components of the fluorescent light, including the electrodes, terminals, mercury, etc., are assembled in the conventional manner.

TABLE IV

| Example No. | Rare Earth Oxide | Weight (Parts) | Other Oxide | Weight (Parts) | Product | M.P. (° C.) | Density, g./cc. | Color | Luminescence Rating [1] at 77° K. Radiated with 2,537 A. |
|---|---|---|---|---|---|---|---|---|---|
| 1 | $Sc_2O_3$ | 0.3586 | $WO_3$ | 1.6879 | $Sc_2O_3 \cdot 3WO_3$ | 1,640 | 4.45 | White | 4 |
| 2 | $Sc_2O_3$ | 1.000 | $WO_3$ | 0.5603 | $3Sc_2O_3 \cdot WO_3$ | | | do | 5 |
| 3 | $Eu_2O_3$ | 0.7094 | $WO_3$ | 1.2094 | $Eu_2O_3 \cdot 3WO_3$ | 1,160 | 7.17 | do | 5 |
| 4 | $Gd_2O_3$ | 0.6957 | $WO_3$ | 1.2335 | $Gd_2O_3 \cdot 3WO_3$ | 1,200 | 7.33 | do | 5 |
| 5 | $Lu_2O_3$ | 0.7179 | $WO_3$ | 1.1686 | $Lu_2O_3 \cdot 3WO_3$ | 1,590 | 5.42 | do | 5 |
| 6 | $La_2O_3$ | 1.2270 | $WO_3$ | 0.8347 | $La_2O_3 \cdot WO_3$ | | | do | 5 |
| 7 | $Gd_2O_3$ | 1.2633 | $WO_3$ | 0.7999 | $Gd_2O_3 \cdot WO_3$ | 1,700 | | do | 4 |
| 8 | $Sc_2O_3$ | 0.3193 | $MoO_3$ | 1.0000 | $Sc_2O_3 \cdot 3MoO_3$ | | | do | 5 |
| 9 | $Eu_2O_3$ | 0.8151 | $MoO_3$ | 1.0000 | $Eu_2O_3 \cdot 3MoO_3$ | | | do | 3 |
| 10 | $Gd_2O_3$ | 0.8395 | $MoO_3$ | 1.0000 | $Gd_2O_3 \cdot 3MoO_3$ | | | do | 5 |
| 11 | $Lu_2O_3$ | 0.9216 | $MoO_3$ | 1.0000 | $Lu_2O_3 \cdot 3MoO_3$ | | | do | 5 |
| 12 | $La_2O_3$ | 0.6519 | $MoO_3$ | 0.5758 | $La_2O_3 \cdot 2MoO_3$ | | | do | 2 |
| 13 | $La_2O_3$ / $Sm_2O_3$ | 0.3128 / 0.0140 | $WO_3$ | 0.6492 | $(La_{0.96}Sm_{0.04})_2O_3 \cdot 3WO_3$ | | | | 5 |
| 14 | $La_2O_3$ / $Dy_2O_3$ | 0.3128 / 0.0149 | $WO_3$ | 0.6492 | $(La_{0.96}Dy_{0.04})_2O_3 \cdot 3WO_3$ | | | | 5 |
| 15 | $Gd_2O_3$ / $Sm_2O_3$ | 0.3480 / 0.0140 | $WO_3$ | 0.6492 | $(Gd_{0.96}Sm_{0.04})_2O_3 \cdot 3WO_3$ | | | | 5 |
| 16 | $Gd_2O_3$ / $Dy_2O_3$ | 0.3480 / 0.0149 | $WO_3$ | 0.6492 | $(Gd_{0.96}Dy_{0.04})_2O_3 \cdot 3WO_3$ | | | | 5 |

[1] Qualitative rating wherein 0 represents no observable luminescence, 1 represents feeble luminescence, etc., and 5 represents bright luminescence.

The following examples illustrate preparation of luminescent compositions and articles fabricated therewith.

*Example 17*

0.5 part of $Eu_2O_3 \cdot 3WO_3$ are added to 10 parts of a 20% solution in methyl ethyl ketone of polymethyl methacrylate and thoroughly blended to produce a homogeneous slurry. The resulting coating composition of this invention is applied to the surface of a glass plate and As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A luminescent composition selected from the group consisting of $Sc_2O_3 \cdot 3WO_3$, $3Sc_2O_3 \cdot WO_3$, $Eu_2O_3 \cdot 3WO_3$, $Gd_2O_3 \cdot 3WO_3$, $Lu_2O_3 \cdot 3WO_3$, $La_2O_3 \cdot WO_3$, $Gd_2O_3 \cdot WO_3$, $Sc_2O_3 \cdot 3MoO_3$, $Eu_2O_3 \cdot 3MoO_3$, $Gd_2O_3 \cdot 3MoO_3$, $Lu_2O_3 \cdot 3MoO_3$ $La_2O_3 \cdot 2MoO_3$, $(La_{1-x}Sm_x)_2O_3 \cdot WO_3$, $(La_{1-x}Dy_x)_2O_3 \cdot 3WO_3$ $(Gd_{1-x}Sm_x)_2O_3 \cdot 3WO_3$ and $(Gd_{1-x}Dy_x)_2O_3 \cdot 3WO_3$ wherein $x$ is from about 0.01 to 0.10.

2. A luminescent composition having the formula $Sc_2O_3 \cdot 3WO_3$.

3. A luminescent composition having the formula $3Sc_2O_3 \cdot WO_3$.

4. A luminescent composition having the formula $Eu_2O_3 \cdot 3WO_3$.

5. A luminescent composition having the formula $Gd_2O_3 \cdot 3WO_3$.

6. A luminescent composition having the formula $Lu_2O_3 \cdot 3WO_3$.

7. A luminescent composition having the formula $La_2O_3 \cdot WO_3$.

8. A luminescent composition having the formula $Gd_2O_3 \cdot WO_3$.

9. A luminescent composition having the formula $Sc_2O_3 \cdot 3MoO_3$.

10. A luminescent composition having the formula $Eu_2O_3 \cdot 3MoO_3$.

11. A luminescent composition having the formula $Gd_2O_3 \cdot 3MoO_3$.

12. A luminescent composition having the formula $Lu_2O_3 \cdot 3MoO_3$.

13. A luminescent composition having the formula $La_2O_3 \cdot 2MoO_3$.

14. A luminescent composition having the formula $(La_{1-x}Sm_x)_2O_3 \cdot 3WO_3$ wherein $x$ is from about 0.01 to 0.10.

15. A luminescent composition having the formula $(La_{1-x}Dy_x)_2O_3 \cdot 3WO_3$ wherein $x$ is from about 0.01 to 0.10.

16. A luminescent composition having the formula $(Gd_{1-x}Sm_x)_2O_3 \cdot 3WO_3$ wherein $x$ is from about 0.01 to 0.10.

17. A luminescent composition having the formula $(Gd_{1-x}Dy_x)_2O_3 \cdot 3WO_3$ wherein $x$ is from about 0.01 to 0.10.

References Cited

Hoffman, Lexikon der Anorganischen Verbindungen, Band 2, A1-X, No. 56-81, 1914, pages 625 and 747-751.

Kroger, Some Aspects of the Luminescence of Solids, Elsevier Pub. Co. Inc., New York, 1948, pages 109, 110, 286, and 288-298.

Partington, Textbook of Inorganic Chemistry, Sixth Edition, Macmillan & Co. Ltd., London, 1950, page 819.

Pascal, Nouveau Traité de Chimie Minerale, Tome VII, Deuxiame Fascicule, 1959, pages 947-953.

Sneed et al., Comprehensive Inorganic Chemistry, D. Van Nostrand Co., Inc., New York, 1955, Volume IV, pages 142, 150, and 182.

Vickery, Studies of Rare Earth Tungstates, J.C.S., 1949, Part III, pages 2501-5.

TOBIAS E. LEVOW, *Primary Examiner*.

R. D. EDMONDS, *Assistant Examiner*.